UNITED STATES PATENT OFFICE.

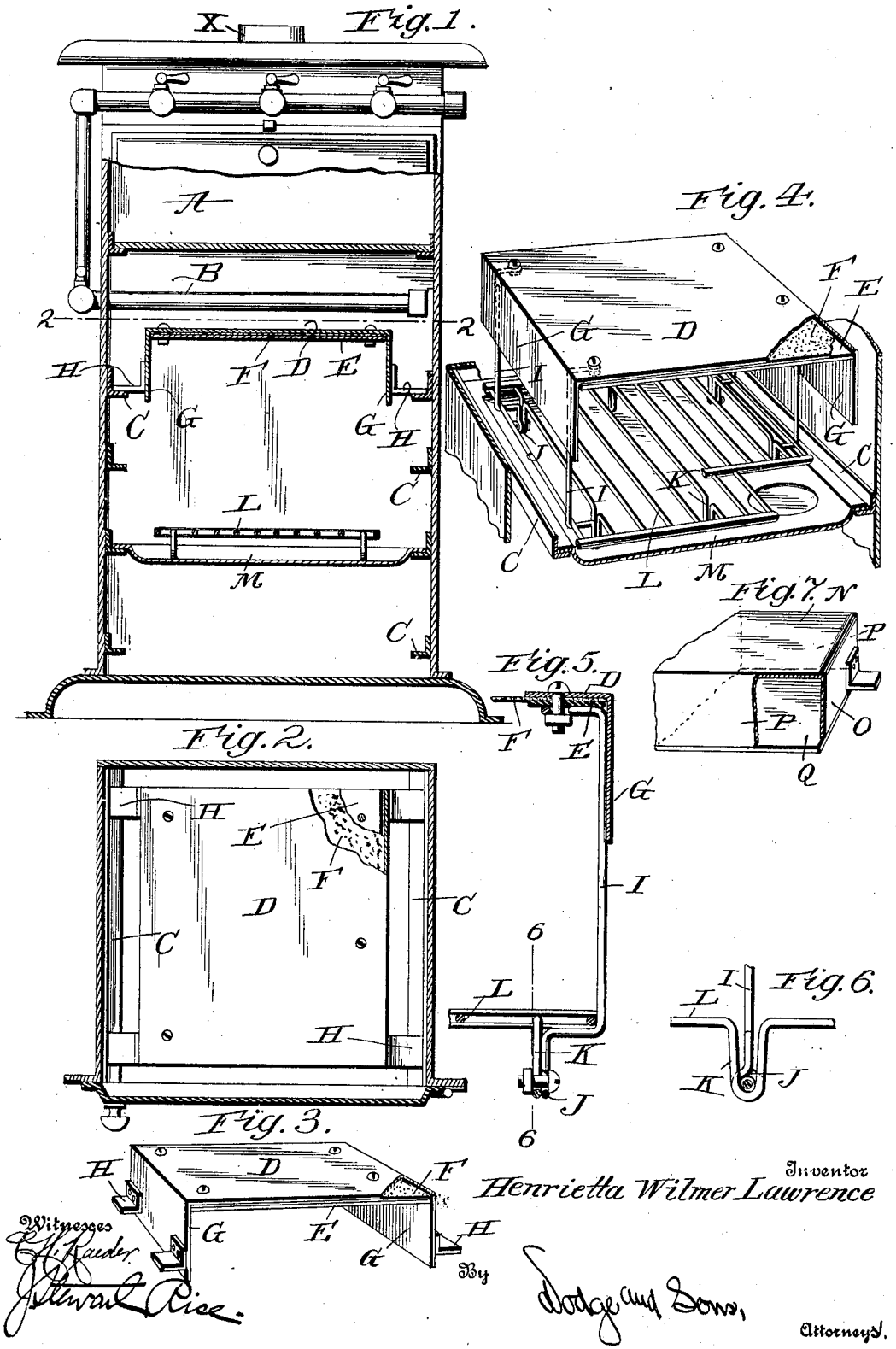

HENRIETTA WILMER LAWRENCE, OF BALTIMORE, MARYLAND.

GAS-RANGE.

No. 827,871.      Specification of Letters Patent.      Patented Aug. 7, 1906.

Application filed December 5, 1905. Serial No. 290,399.

*To all whom it may concern:*

Be it known that I, HENRIETTA WILMER LAWRENCE, a citizen of the United States, residing at Baltimore, in the State of Maryland, have invented certain new and useful Improvements in Gas-Ranges, of which the following is a specification.

My present invention pertains to improvements in gas-ranges the construction and advantages of which will be hereinafter pointed out, reference being had to the annexed drawings, wherein—

Figure 1 is a front elevation of a gas-range, the major portion of which is, however, shown in section to more clearly illustrate the invention; Fig. 2, a transverse horizontal sectional view taken on the line 2 2 of Fig. 1; Fig. 3, a perspective view of the combined shield and deflector; Fig. 4, a perspective view showing a modified form of deflector and its relation to the other or usual accessories of a gas-range; Fig. 5, a vertical sectional view, on an enlarged scale, showing the connections between the shield or deflector and the usual rack used in conjunction with a gas-range; Fig. 6, a vertical sectional view taken on the line 6 6 of Fig. 5, and Fig. 7 a detail perspective view showing a further modification of the invention.

The main object of my invention is to provide means whereby the usual broiling-chamber of a gas-range may be converted temporarily into a second oven and said second oven and the ordinary oven employed at one and the same time for baking. The means employed by me for this purpose are readily removable from the broiling-chamber, so that said chamber may be used for broiling when required.

With my construction the burners which heat the upper oven are employed at the same time to heat the lower oven or the converted broiling-chamber. Previous to my invention, so far as I am aware, no means have been provided whereby the broiling-chamber could be converted into an oven and the usual burners which underlie the bottom of the upper oven employed for heating both the upper and lower ovens at the same time. The arrangement which will hereinafter be set forth in detail renders the use of a gas-range quite economical, in that instead of boiling vegetables, for instance, over the usual upper burners the same may be baked in the converted broiling-chamber while the upper oven is being used for baking other foods, such as meats or the like.

Referring to the construction shown in Figs. 1 to 3, A indicates the upper oven, constructed as usual, and B the burners underlying the base of the oven and serving to heat the same and also to heat the broiling-chamber below said burners. The side walls of the broiling-chamber are provided with supporting irons or brackets C, as is usual. In the present instance I propose to interpose between the burners B and the lower portion of the broiling-chamber a shield or deflector which will prevent the direct radiation of the heat upon the food which is placed in the converted broiling-chamber below said deflector or shield. In the form shown in Figs. 1 to 3 the shield or deflector comprises two plates D and E, having secured between them a sheet of insulating material—such, for instance, as asbestos, which is designated by the letter F. Plate D is provided with downwardly-extending portions or side walls G, to the outer faces of which are secured brackets or finger-pieces H.

As will be seen upon reference to Figs. 1 and 2, the shield is of such size as to leave spaces between it and the walls of the stove, the downwardly-projecting walls G likewise standing away from the brackets C in order that the heat emanating from the burners may be allowed to pass down around the deflector and beneath the articles being baked, which is normally supported upon a pan or rack carried by the brackets to a point below the deflector. It has been found that the currents of hot air which are caused to pass down adjacent to the side walls of the range will apply as much, if not more, heat to the lower portion of the receptacle in which the food is being cooked than to the top of the material. The upper face of the shield or deflector being imperforate, heat is prevented from passing directly to the upper surface of the material being baked, so that the lower portion of the receptacle will receive as great an amount of heat as the upper portion, and the food contained therein will be found to be thoroughly and evenly cooked.

Instead of supporting the shield or deflector in the manner shown in Figs. 1 to 3 I may support it from below, as illustrated in Figs. 4, 5, and 6. In said figures it will be noted that arms I are secured to the under face of the shield, said arms being extended downwardly and turned inwardly, as shown in detail in Fig. 5, and again downwardly, each arm having an eye J formed at the lower end thereof, through which a bolt is passed, the end of the bolt bearing against the upstanding wall of the foot-piece or leg K of the rack L. Said rack in turn is shown as supported by the pan M. As under the former construction, the shield is of a size less than the interior dimensions of the range, so that a passage is left between the shield or deflector and the side walls of the range.

In Fig. 7 I have shown the shield or deflector as provided with a dead-air space. This construction is employed in lieu of the asbestos sheet F. The upper plate N is provided with downwardly-projecting sides O and ends P, to which is secured a bottom plate Q. With this construction, as above noted, a dead-air space is produced, the confined air acting as an insulating medium and preventing too great an amount of heat from being applied to the upper surface of the food being cooked in the converted broiling-chamber. The products of combustion from the burners B pass upward around the upper oven and escape through the flux X, Fig. 1, as is usual.

The invention is not to be confused with the reflector-plates which are sometimes placed beneath the oven-burners and serve, as their name indicates, to reflect the heat upwardly against the bottom of the upper oven, nor with a construction which employs a foraminous plate beneath the burners, which permits the heat to pass directly to the article below through the openings in the plate. With the former the heat is cut off from the space below, while with the latter the articles are broiled and baking is impossible.

Having thus described my invention, what I claim is—

1. In a gas-range, the combination of an upper oven; a burner arranged below the bottom thereof and in the upper portion of the usual broiling-chamber formed in the lower part of the range; a removable deflector in the upper portion of said broiling-chamber, the deflector being of a size less than that of the interior dimensions of the range, whereby a space is left between the deflector and the adjacent walls of the range and the broiling-chamber is temporarily converted into a second oven; and means for supporting said deflector within the upper portion of said chamber.

2. In a gas-range, the combination of an upper oven; a burner arranged below the bottom thereof and in the upper portion of the usual broiling-chamber; a removable deflector provided with an insulated face, said deflector being of a size less than that of the interior dimensions of the range; and means for supporting said deflector within the upper portion of the broiling-chamber, whereby a space will be left around said deflector and said chamber will be temporarily converted into a second oven, substantially as described.

3. A gas-range provided with the usual upper oven; a burner located below the bottom thereof and in the upper portion of the usual broiling-chamber; a removable deflector of a size less than that of the interior dimensions of the range; a rack; and supporting-arms extending upwardly from the rack and connected to the deflector, whereby the deflector will be held in the upper portion of the broiling-chamber beneath the burner, substantially as described.

4. A gas-range provided with the usual upper oven; a burner located beneath the bottom thereof and in the upper portion of the usual broiling-chamber; and a removable deflector supported in the upper portion of the broiling-chamber beneath the burner, said deflector being provided with downwardly-extending walls at its ends, the deflector being of such size as to provide passages or openings entirely around the same between its outer edges and the adjacent walls of the range, whereby the broiling-chamber will be temporarily transformed into a second oven.

In testimony whereof I have signed my name to this specification in the presence of two subscribing witnesses.

HENRIETTA WILMER LAWRENCE.

Witnesses:
CHARLES M. COHN,
SYDNEY S. BOUIS.